United States Patent [19]
Little

[11] 3,771,758
[45] Nov. 13, 1973

[54] LINED PINCH VALVE BODY

[75] Inventor: Robert K. Little, Mount Holly, N.J.

[73] Assignee: RKL Controls, Inc., Hainesport, N.J.

[22] Filed: Apr. 5, 1971

[21] Appl. No.: 131,366

[52] U.S. Cl. ................................ 251/4, 138/141
[51] Int. Cl. ............................................. F16k 7/02
[58] Field of Search ................................ 251/4–10; 138/140, 141, 122, 146

[56] References Cited
UNITED STATES PATENTS

| | | | |
|---|---|---|---|
| 2,995,335 | 8/1961 | Raftis | 251/5 |
| 3,268,201 | 8/1966 | Little | 251/8 |
| 3,494,588 | 2/1970 | Kisling | 251/5 |
| 3,584,656 | 6/1971 | Assendelet et al. | 138/141 |
| 3,599,677 | 8/1971 | O'Brien | 138/122 |

Primary Examiner—Martin P. Schwadron
Assistant Examiner—David R. Matthews
Attorney—Howson & Howson

[57] ABSTRACT

A pinch valve body having a cast polyurethane liner within a fabric reinforced carcass of molded rubber. The lined valve body is made by laying up the carcass on a smooth, clean oversize mandrel with a fabric reinforcement in contact with the mandrel which is frictioned and skimmed on one side only, the uncoated fabric fibers being in direct contact with the mandrel. Reinforcing plys of frictioned and skimmed fabric are applied around the special fabric layer to build the body to the desired strength and thickness. The carcass is then placed in a mold and partially cured under heat and pressure. Following the partial curing step, the oversize mandrel is removed and the carcass is placed in a mold with a conventional size mandrel. Liquid polyurethane is then poured into the mold to fill the void between the mandrel and the carcass. The mold is closed and the body is cured under heat and pressure to complete the curing of the carcass as well as the polyurethane which becomes firmly bonded to the exposed fibers of the special reinforcing fabric.

3 Claims, 12 Drawing Figures

PATENTED NOV 13 1973 3,771,758
SHEET 1 OF 2
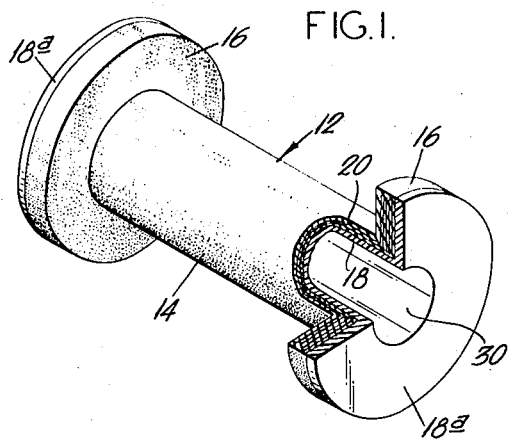
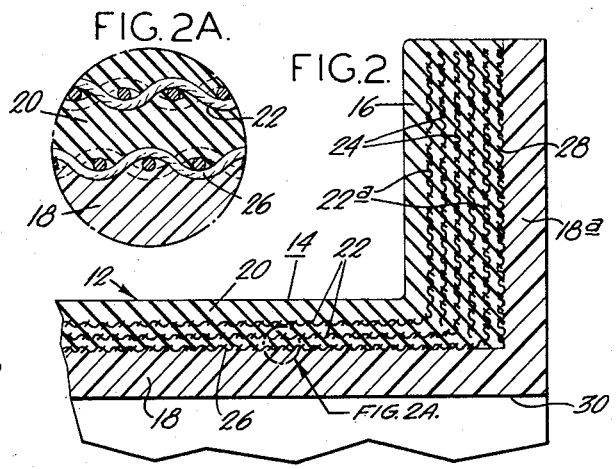
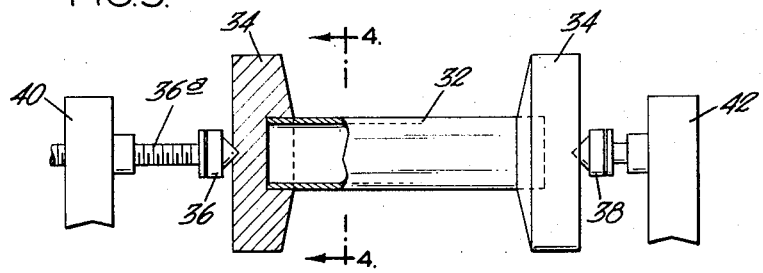
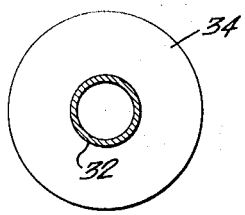
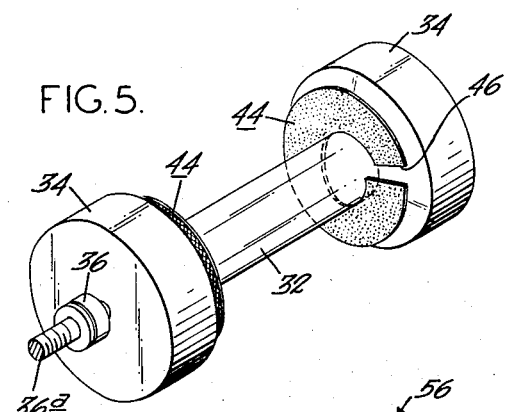
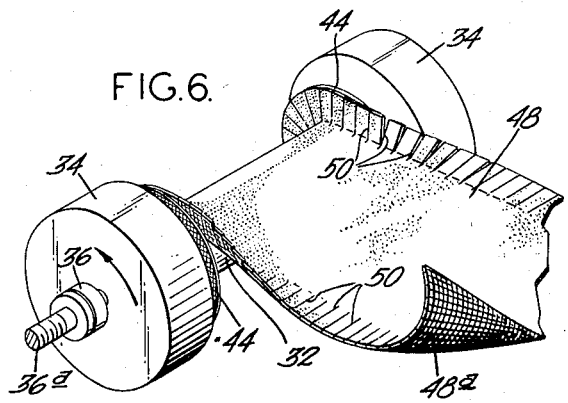
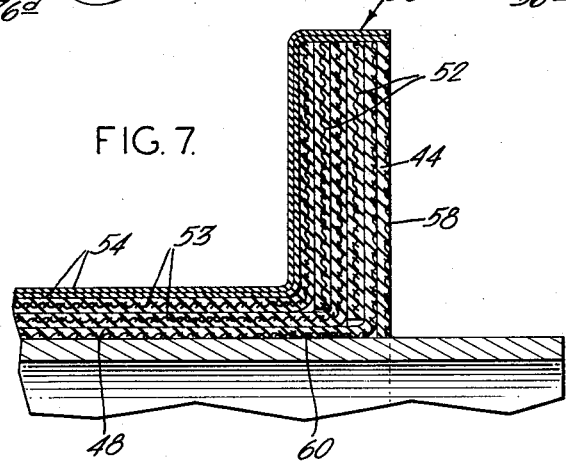
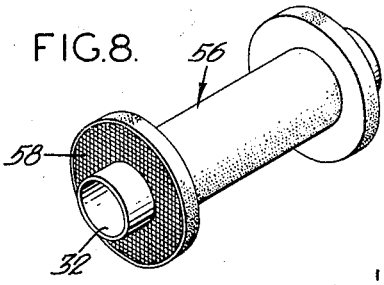
INVENTOR
ROBERT K. LITTLE
BY Howson & Howson
ATTYS.

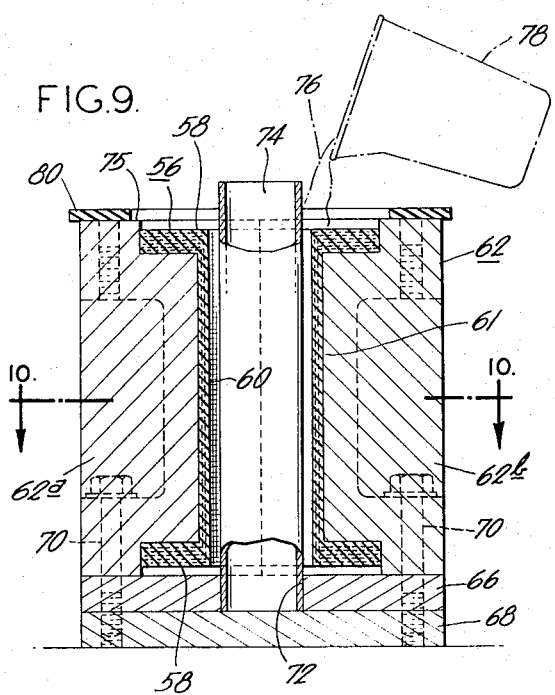
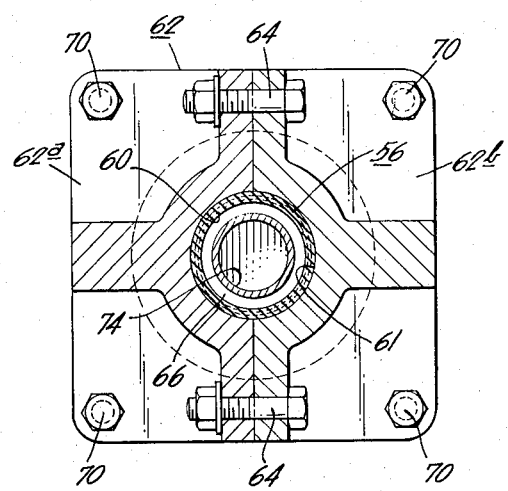
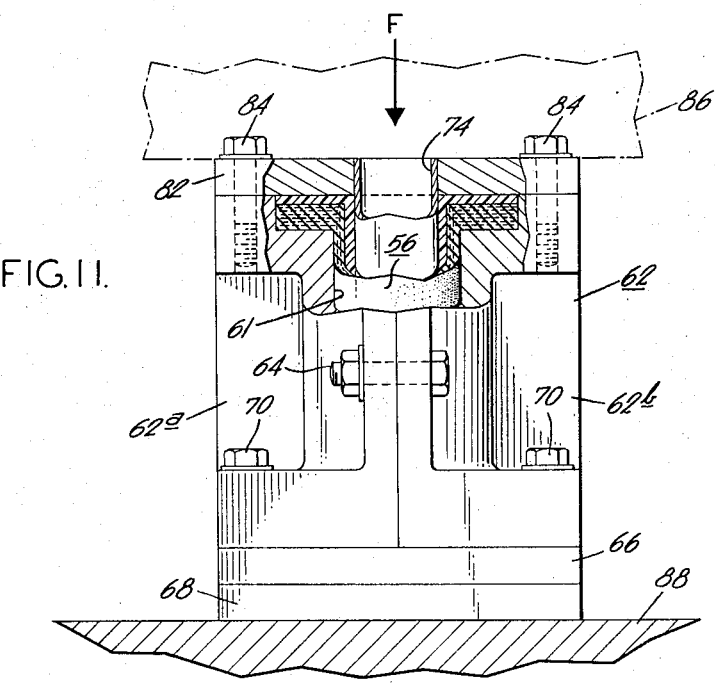

LINED PINCH VALVE BODY

The present invention relates generally to pinch type valves and more particularly to a novel polyurethane lined, fabric reinforced pinch valve body and a method of making same.

Pinch valves have enjoyed wide usage in controlling the flow of abrasive materials such as sand, cement and the like. Pinch valves are particularly well suited for this type of service due to their simplicity, smooth-walled flow path, low initial and maintenance costs, their ability to handle flows of fluid, solid, or mixed solid and fluid materials, and their adaptability for remote operation. The valves may be used for either vacuum or pressure service and may be built in practically any required size.

Care must be exercised in choosing the materials of the resilient pinch valve body, since the materials chosen can greatly influence the service life of the body, particularly when the flow of corrosive or abrasive materials is to be controlled. Fabric-reinforced molded rubber valve bodies are generally employed under conditions requiring frequent cycling and high pressure material flow. Although characterized by high strength, the reinforced rubber valve bodies do not have exceptionally good abrasion resistant qualities. Thus for conditions requiring control of highly abrasive materials, the entire valve body might be made of a material such as polyurethane which exhibits superior abrasion resistance. Polyurethane is, however, considerably more expensive than rubber, and valve bodies made wholly of this material do not have the high strength of the molded fabric reinforced rubber bodies, hence being relegated to use under relatively low pressure conditions.

In the present invention, a valve body has been developed which is characterized by a fabric-reinforced molded rubber carcass having an inner lining of cast polyurethane. This structure provides the superior abrasion resistant qualities of polyurethane in the surfaces engaged by the material flow while at the same time providing the high strength qualities of the fabric-reinforced rubber which permits use under relatively high line pressure conditions. In addition, the cost of the body is low in view of the minimal amount of polyurethane required. The invention accordingly provides an inexpensive, high strength, highly abrasion resistant valve body structure which is especially suited for the handling of abrasive materials.

The method of making the present valve body in brief includes the construction of a fabric-reinforced molded rubber carcass on an oversize mandrel. The carcass includes a special fabric reinforcement adjacent the mandrel which is frictioned and skimmed on one side and disposed so that only the uncoated fabric fibers are in direct contact with the mandrel. After the laminated carcass has been built up to the desired thickness, it is partially cured in a mold under heat and pressure. The oversize mandrel is then removed, and a mandrel having a diameter equal to the desired flow passage size of the valve is employed in a further molding step, the lower end of the mold being sealed and the upper end open. Polyurethane in a liquid state is poured into the mold to fill the space between the mandrel and the uncoated fabric. The mold is then sealed and the assembly is subjected to heat and pressure to complete the cure of the carcass and to cure the polyurethane liner so that the liner is bonded into the fabric strands of the special fabric reinforcement.

It is accordingly a primary object of the present invention to provide a pinch valve body having a polyurethane liner cast within a fabric-reinforced rubber carcass.

It is a further object of the invention to provide a lined valve body as described having exceptional abrasion-resistance and high strength to permit its utilization with abrasive materials and high line pressures.

Another object of the invention is to provide a lined pinch valve body as described which can be economically manufactured.

Still another object of the invention is to provide a method of making a lined pinch valve body as described which can be carried out economically with a minimal equipment investment and which utilizes to a large degree conventional pinch valve body molding equipment.

Additional objects and advantages of the invention will be more readily apparent from the following detailed description of embodiments thereof when taken together with the accompanying drawings wherein:

FIG. 1 is a perspective view of a lined valve body embodying the present invention with a portion thereof cut away to show interior details of construction;

FIG. 2 is an enlarged partial sectional view of one of the flanged ends of the valve body of FIG. 1 showing the fabric reinforcement layers and the polyurethane lining;

FIG. 2A is a greatly enlarged view taken on the circled portion of FIG. 2 and showing the manner in which the poly-urethane becomes bonded to the fibers of the adjacent reinforcing fabric layer;

FIG. 3 is a schematic view partly in section showing the oversize mandrel on which the fabric-reinforced rubber carcass is initially laid up;

FIG. 4 is a sectional view taken along line 4—4 of FIG. 3;

FIG. 5 is a perspective view showing the mandrel of FIGS. 3 and 4 with the special fabric rings in position thereon;

FIG. 6 is a view similar to FIG. 5 showing the start of the winding of the special fabric material on the mandrel;

FIG. 7 is an enlarged partial sectional view taken axially through the laid up carcass elements on the mandrel prior to the partial curing thereof;

FIG. 8 is a perspective view of the partially cured carcass on the oversize mandrel;

FIG. 9 is a vertical sectional view showing the carcass in a mold with a regular size mandrel in place and showing in dot and dash lines the manner in which the polyurethane is poured between the carcass and mandrel to form the liner;

FIG. 10 is a sectional view taken along line 10—10 of FIG. 9; and

FIG. 11 is an elevational view of the closed mold partly broken away for clarity, the mold being positioned in a press for the final curing operation.

In the conventional manufacture of fabric-reinforced molded rubber pinch valve bodies, layers of uncured pure gum rubber or other elastomer are applied to a mandrel having an external cylindrical surface of the size desired for the valve body fluid passage. The mandrel is initially coated with a suitable parting agent such as a silicone compound to permit ready removal of the mandrel following the curing of the body. Next, frictioned and skimmed fabric is wrapped around the initial layers to the desired thickness. If, as is usually the case, the body has end flanges, suitable ring-shaped layers are provided to establish the flange portions, and the central mandrel wrappings of skimmed fabric may be interwoven into the fabric layers of the flange regions. A thin cover wrap, for example of neoprene, completes the fabrication, and the entire assembly is placed in a mold and subjected to heat and pressure for a predetermined time to cure the elements into a substantially homogeneous fabric reinforced pinch valve body.

The above described valve body and method, although entirely conventional, are briefly described so that the similarities and differences of the present valve body and method can be more readily understood.

Referring to FIGS. 1, 2 and 2A of the drawings, a valve body 12 incorporating the present invention is of a conventional pinch valve body shape and size, and is characterized by a central cylindrical portion 14 terminating in opposed flanged ends 16. As most readily shown by FIG. 2, the valve body comprises an inner liner 18 of polyurethane, the liner 18 extending at 18a over the end faces of the flanged ends 16. The remainder of the valve body is formed of an elastomeric material 20 such as gum rubber which is reinforced by a plurality of fabric layers 22 molded therewithin. Portions 22a of the longitudinal fabric reinforcements 22 extend into the flanged portions 16 and are spaced therein between ring shaped fabric reinforcements 24. The innermost layer 26 of reinforcing fabric in the cylindrical portion 14 of the body and the innermost layer 28 in the flanged ends 16 form the boundary between the elastomer 20 and the polyurethane liner 18 as shown in FIG. 2A. The fabric layers 26 and 28 are impregnated on one side with the elastomer 20 and on the other side with the polyurethane liner 18.

The described structure provides a central concentric passage 30 through which material is adapted to flow at a rate controlled by the pinching of the cylindrical body portion 14 in a manner well known in the art. A typical valve assembly in which a valve body of the present type might be employed is shown for example in my U.S. Pat. No. 3,268,201. The polyurethane liner provides an extremely abrasion resistant surface to the material flow, and the surrounding fabric reinforced rubber region provides sufficient strength to permit use of the valve body under relatively high pressure conditions.

The method of making the described valve body is shown in FIG. 3-11. Apparatus useful for carrying out this method includes a cylindrical mandrel 32 having a diameter substantially larger than the intended diameter of the fluid passage 30 of the valve body. The "oversize" mandrel 32 is provided with a pair of end forms 34, and the combined mandrel and end forms are rotatably supported between centers 36 and 38 respectively mounted on frame members 40 and 42. The center 36 includes a threaded shaft 36a to permit adjustment of the distance between centers for the mounting of the described assembly.

The first step in fabricating the assembly as shown in FIG. 5 involves the positioning of flange rings 44 on the mandrel adjacent each of the end forms. The rings 44 are made of a special fabric which is frictioned and skimmed with uncured rubber on one side only, the fabric side being placed against the inner faces of the end forms. Both the end forms and the oversize mandrel are completely clean and are not provided with any type of parting agent. The rings 44 are radially cut at 46 to allow them to be slipped over the mandrel. The inner diameter of the rings allows them to fit snugly over the mandrel while their outer diameter is slightly less than that of the desired valve body flange diameter.

In the second step, as shown in FIG. 6, a sheet 48 of the same special fabric which is frictioned and skimmed on one side only is wound about the mandrel with the exposed fabric side 48a against the mandrel. The sheet 48 is of such a width that by means of slits 50 in each edge thereof, the sheet edges may be flared upwardly into the flange area adjacent the rings 44. The sheet 48 is wound around the mandrel for one revolution, and any excess material is trimmed away.

The laying up of the body continues with the application of alternately disposed rings 52 and sheets 53 adjacent the rings 44 and sheet 48, the rings 52 and sheets 53 comprising conventional frictional and skimmed or rubber-coated fabric. When the desired thickness of the cylindrical portion and flange portions has been produced, thin layers 54 of neoprene are applied as shown in FIG. 7 to complete the assembly on the oversize mandrel. This assembly is termed the "carcass" and is generally designated 56.

The carcass 56 still on the oversize mandrel 32, is placed in a mold having the desired external dimensions of the finished valve body 12 and is subjected to heat and pressure to achieve approximately a two-thirds cure of the elastomeric layers. The partially molded carcass upon removal from the molds has the appearance shown in FIG. 8, the exterior diameter of the cylindrical portion and flanges and the spacing between the flanges being the final dimensions desired for the valve body. The flange end faces 58 of the carcass as well as the inner cylindrical surface 60 thereof comprise the exposed clean fabric surfaces of the special fabric rings 44 and sheet 48 utilized in laying up the initial layer of the carcass. The clean fabric of the surface 60 permits the oversize mandrel to be removed without difficulty.

With the oversize mandrel removed, the carcass 56 as shown in FIG. 9 is placed in the chamber 61 of a mold 62 of a conventional type which comprises opposing mold halves 62a and 62b secured together by bolts 64. End plates 66 and 68 are then secured to one end of the mold by bolts 70, the end plate 66 having a central bore 72 for receiving and centrally positioning a mandrel 74 within the mold. The external diameter of the cylindrical mandrel 74 is equal to the desired internal diameter of the finished valve body. The surfaces of the chamber 61 as well as the mandrel 74 are coated with a suitable compound which might for example be a silicone compound to permit the ready release of the molded body.

The shape and dimensions of the mold cavity 61 are the desired final shape and dimensions of the finished valve body. Since the outer surface of the cylindrical portion of the carcass as well as the circumferential edges and the inner faces of the carcass flange portions have been partially molded to the desired final dimensions of the valve body, it will be noted in FIG. 9 that the carcass along these surfaces fits tightly into the mold chamber 61. The only surfaces of the carcass that are not in engagement with the chamber surfaces are the clean fabric surfaces 58 of the carcass flange portions and the internal bore 60. These surfaces, as shown in FIG. 9, are spaced a selected distance from the opposing mold elements, in the case of lower surface 58 from the end plates 66, and the surface 60 from the mandrel 74. The mold extends to an upper edge 75 spaced above the upper carcass flange surface 58 the same distance as the plate 66 is spaced from the lower surface 58. Into the cavity formed by this spacing, liquid polyurethane is poured as schematically indicated in dot and dash lines in FIG. 9 at 76 from a container 78. An annular dam 80 is temporarily placed around the top edge of the mold to contain the polyurethane and to insure that a slight excess of urethane is poured to permit the application of pressure during curing of the valve body.

After the polyurethane has been poured into the mold cavity to the level of the top edge of the dam 80, and after a short interval has elapsed to allow the setting up of the polyurethane in the dam region, the dam is removed and a mold end plate 82 is placed over the upper end of the mandrel and secured by bolts 84 which also serve to center the upper end of the mandrel 74. Prior to tightening the bolts 84, the entire mold is placed between the upper and lower platens 86 and 88 of a press and a force F is applied as illustrated to bring the end plate 82 down on the mold halves 62a and 62b and exert a substantial pressure on the polyurethane within the mold cavity due to the excess provided in the dam region. The bolts 84 are then tightened to sustain the pressure initially applied by the press, and the mold is then placed in a curing oven to provide a complete cure of the polyurethane and the rubber carcass. Following the curing step, the mold is opened and the completed polyurethane lined, fabric-reinforced valve body is removed.

The completed valve body will have the appearance shown in FIG. 1 and 2 after the trimming of flash from the flanges. The molded polyurethane forms the liner 18 which provides the superior abrasion resistance in the region engaged by material flow. The molded carcass portion of the valve is now essentially a homogeneous gum rubber region through which pass the several layers of reinforcing fabric. The special fabric rings 44 and sheet 48 provide respectively the reinforcing fabric layers 28 and 26 of the molded valve body as shown in FIG. 2. The remaining reinforcing fabric layers 22 and 24 are derived respectively from the sheets 53 and rings 52 used to build up the carcass.

The equipment required for carrying out the process described is largely that required for a conventional pinch valve body fabrication. For example, the mold halves 62a and 62b are the same as those used for a conventional valve body of the same size. These same mold halves may be used both in the partial curing of the carcass 56 and in the pouring of the liner and curing of the carcass and liner. There is thus with the exception of the oversize mandrel and certain end plate modifications, relatively little new equipment required to carry out the novel process steps.

It will be apparent that while polyurethane is the preferred material from which the liner is cast, other similar castable materials might readily be substituted. It will further be obvious that the thickness of the lining and the number of plys of the carcass may be selected to produce the thickness and strength of the valve body desired. The flange portions might for example be reinforced with additional fabric layers, or, if desired, with metal reinforcing rings.

Manifestly, other changes in details of construction can be effected by those skilled in the art without departing from the spirit and the scope of the invention.

I claim

1. A pinch valve body comprising a molded elastomeric carcass, and an integral liner of a castable elastomeric material, said carcass comprising a substantially cylindrical hollow fabric-reinforced portion and fabric-reinforced flange portions extending radially outwardly from each end of said cylindrical portion, said carcass cylindrical portion including a radially innermost layer of fabric frictioned and skimmed on the outer side only, said carcass flange portions including an axially outermost layer of fabric frictioned and skimmed on the inner side only, said liner being cast within said carcass to provide a bond with said carcass fabric layers, said liner including a hollow substantially cylindrical portion within and coextensive with said carcass cylindrical portion and integral flange portions covering the outer end faces of said carcass flange portions.

2. The invention as claimed in claim 1 wherein said castable liner material comprises polyurethane.

3. The invention as claimed in claim 1 wherein said carcass comprises molded layers of rubberized fabric.

* * * * *